(12) United States Patent
Ng et al.

(10) Patent No.: US 8,764,894 B2
(45) Date of Patent: Jul. 1, 2014

(54) INK DISPERSION

(75) Inventors: Hou T. Ng, Palo Alto, CA (US); Manoj K. Bhattacharyya, Palo Alto, CA (US); Howard S. Tom, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 238 days.

(21) Appl. No.: 12/916,141

(22) Filed: Oct. 29, 2010

(65) Prior Publication Data

US 2012/0103542 A1   May 3, 2012

(51) Int. Cl.
*C09D 11/02* (2014.01)

(52) U.S. Cl.
USPC .................. 106/31.59; 106/31.89; 106/31.58; 106/31.86

(58) Field of Classification Search
USPC .................. 106/31.59, 31.89, 31.58, 31.86
See application file for complete search history.

(56) References Cited

U.S. PATENT DOCUMENTS

| | | | |
|---|---|---|---|
| 3,264,242 A * | 8/1966 | Teot | 106/287.19 |
| 3,824,117 A * | 7/1974 | Anderson et al. | 430/270.1 |
| 4,627,876 A | 12/1986 | Fries et al. | |
| 5,098,478 A * | 3/1992 | Krishnan et al. | 106/31.89 |
| 5,198,024 A | 3/1993 | Tuovinen et al. | |
| 5,643,357 A * | 7/1997 | Breton et al. | 106/31.25 |
| 5,746,818 A * | 5/1998 | Yatake | 106/31.86 |
| 5,801,135 A | 9/1998 | Miyauchi et al. | |
| 5,885,413 A | 3/1999 | Richmann et al. | |
| 6,162,453 A * | 12/2000 | Keys | 424/405 |
| 6,274,645 B1 * | 8/2001 | Gundlach et al. | 523/160 |
| 6,890,378 B2 * | 5/2005 | Yatake et al. | 106/31.59 |
| 7,592,434 B2 | 9/2009 | Kerovuo et al. | |
| 2003/0084817 A1 * | 5/2003 | Sarkisian et al. | 106/31.58 |
| 2004/0134379 A1 * | 7/2004 | Wong et al. | 106/31.25 |
| 2005/0039634 A1 * | 2/2005 | Hermansky | 106/31.59 |
| 2005/0137282 A1 | 6/2005 | Cagle et al. | |

(Continued)

FOREIGN PATENT DOCUMENTS

| | | |
|---|---|---|
| EP | 0307024 | 3/1989 |
| JP | 07-084395 | 3/1995 |

(Continued)

OTHER PUBLICATIONS

Gleisner, R. and Blankenburg, J., Semiannual Patents Review: Jul. 2002-Dec. 2002. (Research Paper) Progress in Paper Recycling, vol. 12, No. 3, pp. 26-33 [online], May 2003 [retrieved on Mar. 31, 2010]. Retrieved from the Internet: <URL: http://www.fpl.fs.fed.us/documnts/pdf2003/gleis03a.pdf>.

(Continued)

*Primary Examiner* — Veronica F Faison (57) ABSTRACT

An ink dispersion includes an ink vehicle and a colorant dispersed in the ink vehicle. The ink vehicle includes a non-ionic surfactant and a solvent. The non-ionic surfactant has an HLB value ranges from about 5 to about 16, and is chosen from: i) a material represented by one of the formulas $R_1-O-(OR_2)_n-H$, $R_1-(OR_2)_n-OH$ or $R_1-C_6H_4-(OR_2)_n-OH$, wherein: $R_1$ is chosen from a) a linear or cyclic alkyl group including from 3 to 20 carbon atoms, or b) a substituted or non-substituted alkyl group including from 6 to 18 carbon atoms, $R_2$ is chosen from $CH_2CH_2$ or $CH_2CH_2CH_2$, and n is an integer chosen from 2 to 100; or ii) a diester having at least one ethylene oxide repeating unit; or iii) an octylphenol having at least one ethylene oxide repeating unit.

12 Claims, 3 Drawing Sheets

(56) References Cited

U.S. PATENT DOCUMENTS

| | | |
|---|---|---|
| 2005/0237369 A1 | 10/2005 | Kosaka |
| 2006/0000387 A1* | 1/2006 | Liu et al. .................... 106/31.27 |
| 2006/0197814 A1* | 9/2006 | Doi .............................. 347/100 |
| 2007/0046752 A1* | 3/2007 | Hamajima et al. ............ 347/100 |
| 2007/0252881 A1* | 11/2007 | Sanada et al. ................. 347/100 |
| 2009/0130313 A1 | 5/2009 | Ohshima et al. |
| 2009/0165967 A1 | 7/2009 | Rosencrance et al. |
| 2009/0186162 A1 | 7/2009 | Namba et al. |
| 2010/0173079 A1 | 7/2010 | Akiyama et al. |
| 2010/0175584 A1 | 7/2010 | Kusaka et al. |
| 2010/0180795 A1 | 7/2010 | Ezaki et al. |

FOREIGN PATENT DOCUMENTS

| | | |
|---|---|---|
| JP | 2000-214623 | 8/2000 |
| WO | WO 92/20750 | 11/1992 |
| WO | WO 02/094973 | 11/2002 |

OTHER PUBLICATIONS

Gecol, H., et al., "Use of Surfactants to Remove Solvent-Based Inks from Plastic Films", Colloid Polym Sci, 2003, 281: 1172-1177.

Gecol, H., et al., "Use of Surfactants to Remove Water Based Inks from Plastic Films", Colloids & Surfaces A: Physicochemical & Engineering Aspects, Science Direct, 2001, 2pg.

Gecol, H., et al., Deinking of Water-Based Ink Printing from Plastic Film Using Nonionic Surfactants, Jrnl. of Surfactants and Detergents, vol. 5, No. 4, 2002, pp. 363-374.

"Indigo Guide to Sapphire Treatment", Indigo, Version 2.0, Sep. 1996.

* cited by examiner

INK DISPERSION

BACKGROUND

The present disclosure relates generally to ink dispersions.

Recycling processes may be used to regenerate usable cellulose fibers from waste papers. These recycling processes may involve a deinking method, where ink is removed from waste paper pulp. In some cases, the deinking method includes applying deinking chemicals to waste paper, which interact with and remove the inked portions of the paper. Such deinking processes may, in some instances, pose a challenge for the recycling of some digitally inked papers.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Processes for recycling printed waste papers, in some instances, involve converting the waste paper into a pulp, and then contacting the pulp with deinking chemicals. The deinking chemicals interact with the ink, and then separate the ink from the waste paper. This recycling process has suitably been used for waste papers printed using offset inks, but some challenges may exist for separating and removing digital inks from waste papers. For instance, traditional deinking involves removing ink particulates falling within a size range of about 10 microns to about 100 microns. Some challenges with removing digital ink, particularly digital pigment-based inkjet inks or digital dye-based inkjet inks, include finding a solution to aggregate the pigment particles or the dye molecules into a desired size range, and changing the particles/molecules physical properties from being too hydrophilic to more hydrophobic. It has been found that some existing deinking chemistries do not, in some instances, efficiently separate the ink from fibers of a waste paper. It is believed that the challenge(s) is/are due, at least in part, to the material composition and/or properties of the digital ink, which may, in some instances, adversely interact, or not at all, with the deinking chemicals used by the recycling mill. In many cases, the digital ink cannot be separated and removed from the waste paper to an extent required for adequate waste paper recycling.

Without being bound to any theory, it is believed that digital inks may suitably be separated from waste papers by including therein examples of the deinking component(s) disclosed herein. The deinking component(s) that are incorporated into the digital ink may, in some cases, aid in the interaction of the colorants with deinking chemicals that are introduced during a typical deinking process to assist in separating and removing the digital inks from the waste papers. As such, the incorporation of the deinking component(s) into the ink dispersion advantageously allows the deinking of digitally printed waste papers to be accomplished using existing recycling practices with existing recycling mills. Since examples of the present deinking component(s) may be incorporated into digital inks, the deinking component(s) is/are in close proximity to the colorant particles. This allows the deinking component(s) to favorably interact with the digital ink upon pulping of the waste paper during waste paper recycling.

Example(s) of the ink dispersion (also referred to as an "ink" herein) as disclosed herein include an ink vehicle and a colorant dispersed in the ink vehicle. A deinking component is incorporated into the ink vehicle, as will be described in detail below. In an example, the ink dispersions having the deinking component incorporated therein are digital inks. As used herein, a "digital ink" is a liquid composition, a solid composition, or a composition having a phase that is between a liquid and a solid (e.g., a paste), where any of the inks are printable via a digital printer or printing system. Some examples of digital printers or printing systems include digital inkjet printers, electrophotographic printers, or combinations thereof. It is to be understood, however, that the ink dispersion may also or otherwise be pigment-based inks, dye-based inks, pigment/dye-based inks, traditional offset inks, and/or the like. In other words, the deinking component incorporated into the ink dispersion effectively interacts with the colorant of the foregoing inks to suitably separate the colorant from the waste paper during traditional waste paper recycling.

In an example, the ink dispersion is a water-based ink dispersion, and the ink vehicle of this dispersion is a combination of at least the deinking component and one or more solvents. This combination forms a vehicle in which the colorant is placed to form an example of the ink dispersion.

As briefly mentioned above, the deinking component incorporated into the vehicle is configured to interact with the colorant during waste paper recycling to ultimately remove the ink from a printed medium. The inventors of the instant disclosure have unexpectedly and fortuitously discovered that a non-ionic surfactant having a hydrophilic-lipophilic balance (HLB) value falling within a suitable range acts as a displector in the ink when the ink is exposed to a frother during waste paper recycling. As used herein, the term "displector" refers to a component that functions as i) a dispersant to separate colorant particles from the printed waste paper, and ii) a collector to aggregate certain colorant particles (e.g., molecular dyes, nanometer-sized pigment particles, or the like) to larger particles (e.g., micron-sized pigment particles) during pulping.

It has further been discovered that examples of the deinking component included in the vehicle is an active deinking component that facilitates suitable deinking of at least digital inks from fibers of a medium and/or coating compositions established on the medium prior to inking. The deinking component may also be suitably jetted from a thermal or piezoelectric inkjet printhead.

When the deinking component includes a non-ionic surfactant, the non-ionic surfactant chosen for examples of the ink dispersion exhibits all of the foregoing properties and/or functionalities, and is compatible with hydrophobic or hydrophilic colorants. In an example, the non-ionic surfactant may be represented by one of the following formulas: $R_1$—O—$(OR_2)_n$—H, $R_1$—$(OR_2)_n$—OH, or $R_1$—$C_6H_4$—$(OR_2)_n$—OH. In these formulas, $R_1$ may be chosen, for example, from i) a linear or cyclic alkyl group including from 3 to 20 carbon atoms, but not a branched alkyl group, or ii) a substituted or non-substituted alkyl group including from 6 to 18 carbon atoms, or in some instances, including from 12 to 18 carbon atoms. Further, $R_2$ may be chosen from $CH_2CH_2$ or $CH_2CH_2CH_2$. The letter n is an integer chosen from 2 to 100, or in some instances, from 2 to 50. In an example, n may be an integer chosen from 2 to 20.

The non-ionic surfactant may also be chosen from an ethoxylated fatty alcohol represented by the formula $CH_3(CH_2)_m(OCH_2CH_2)_nOH$, where m is an integer ranging from 1 to 18, and n is an integer ranging from 1 to 200. Several examples of this non-ionic surfactant are set forth below. Of these examples, the following ethoxylated fatty alcohols were found to be useful as a deinking component incorporated into the ink dispersion. These examples include polyethylene glycol hexadecyl ether ($C_{16}H_{33}$—$(OCH_2CH_2)_2OH$) (such as BRIJ® 52, commercially available from Croda International Corp., UK), polyethylene glycol dodecyl ether ($C_{12}H_{25}$—$(OCH_2CH_2)_4OH$) (such as BRIJ® 30 P4391, commercially available from Croda International Corp.), polyethylene glycol stearate $CH_3(CH_2)_{16}COO(CH_2CH_2O)_8H$ (such as MYRJ® 45, commercially available from Atlas Chemical Industries, Inc., Marion, Iowa), polyoxyethylene (10) oleoyl ether ($C_{18}H_{35}$—$(OCH_2CH_2)_{10}OH$) (such as BRIJ® 97, commercially available from Croda International Corp.), polyoxyethylene (20) oleyl ether ($C_{18}H_{35}$—$(OCH_2CH_2)_{20}OH$) (such as BRIJ® 98, commercially available from Croda International Corp.), and combinations thereof. The ethoxylated fatty alcohol may also be an octylphenol having at least one ethylene oxide repeating unit. An example of a suitable octylphenol includes octylphenol ethoxylates (such as TRITON® X-114, TRITON® X-405, TRITON® X-45, and TRITON® X-705, commercially available from Dow Chemical Company, Midland, Mich.).

Some further examples of non-ionic surfactants that may be used as a deinking component in the ink dispersion include decaethylene glycol monododecyl ether, diethylene glycol monodecyl ether, diethylene glycol monohexadecyl ether, diethylene glycol monooctyl ether, diethylene glycol monotetradecyl ether, ethylene glycol monodecyl ether, ethylene glycol monohexadecyl ether, ethylene glycol monooctadecyl ether, ethylene glycol monooctyl ether, heptaethylene glycol monodecyl ether, heptaethylene glycol monododecyl ether, heptaethylene glycol monohexadecyl ether, hexaethylene glycol monodecyl ether, hexaethylene glycol monododecyl ether, hexaethylene glycol monohexadecyl ether, hexaethylene glycol monooctadecyl ether, hexaethylene glycol monotetradecyl ether, octylphenyl polyethylene glycol (such as IGEPAL® CA-630, commercially available from Xiamen Topusing Chemical Co., Ltd., China), nonylphenyl polyethylene glycol (such as NONIDET™ P 40 Substitute, commercially available from Sigma Aldrich, St. Louis, Mo.), octaethylene glycol monodecyl ether, octaethylene glycol monododecyl ether, octaethylene glycol monohexadecyl ether, octaethylene glycol monotetradecyl ether, pentaethylene glycol monodecyl ether, pentaethylene glycol monododecyl ether, pentaethylene glycol monohexadecyl ether, pentaethylene glycol monohexyl ether, pentaethylene glycol monooctadecyl ether, pentaethylene glycol monooctyl ether, pentaethylene glycol monotetradecyl ether, polyoxyethylene (10) tridecyl ether, polyoxyethylene (8) stearate, polyoxyethylene (25) propylene glycol stearate, steareth-100, tetraethylene glycol monodecyl ether, tetraethylene glycol monododecyl ether, tetraethylene glycol monohexadecyl ether, tetraethylene glycol monooctadecyl ether, tetraethylene glycol monooctyl ether, tetraethylene glycol monotetradecyl ether, polyethylene glycol p-(1,1,3,3-tetramethylbutyl)-phenyl ether (TRITON® X-100, commercially available from Dow Chemical Company, Midland, Mich.), and combinations thereof.

In an example, the ink dispersion may include a single non-ionic surfactant. In another example, the ink dispersion may include a combination of two or more non-ionic surfactants.

In another example, the non-ionic surfactant may be chosen from a diester having at least one ethylene oxide repeating unit. The diester may be represented by the formula $CH_3(CH_2)_mCOO(CH_2CH_2O)_nOC(CH_2)_mCH_3$, where m is an integer ranging from 6 to 25, and n is an integer ranging from 5 to 15. Some examples of diesters that may be used include poly(ethylene glycol) distearate, poly(ethylene glycol) palmitate, and/or combinations thereof.

As mentioned above, the non-ionic surfactant chosen for the deinking component has an HLB value falling within a preferred range. As used herein, the HLB value refers to the hydrophile-lipophile balance of a molecule, where the value tends to increase with increasing hydrophilicity. The HLB value of the non-ionic surfactant may be calculated using methods disclosed in e.g., Griffin, W. C., "Classification of Surface-Active Agents by HLB", Journal of the Society of Cosmetic Chemists 1 (1949), pg. 311 and Griffin, W. C., "Calculation of HLB Values of Nonionic Surfactants", Journal of the Society of Cosmetic Chemists 5 (1954), pg. 259, the relevant contents of which are incorporated herein by reference. In an example, the non-ionic surfactant(s) chosen for the deinking component have an HLB value ranging from about 5 to about 16. In another example, the non-ionic surfactant(s) have an HLB value ranging from about 8 to about 13.

In an example, the deinking component may further include an anionic surfactant or a cationic surfactant. These surfactants are included in the ink dispersion in addition to the non-ionic surfactant, and are used to facilitate pigment dispersion stability via, e.g., physisorption onto the pigment surface(s). Some examples of suitable anionic surfactants include alkyl sulfates, sodium dodecyl sulfate, 1-octanesulfonic acid sodium salt, docusate sodium, lithium dodecyl sulfate, N-lauroylsarcosine sodium salt, N-lauroylsarcosine, sodium tetradecyl sulfate (such as NIAPROOF™ 4, commercially available from Niacet Corporation, Niagra Falls, N.Y.), sodium 1-butanesulfonate, sodium 1-decanesulfonate, sodium 1-nonanesulfonate, sodium 1-heptanesulfonate, sodium 1-propanesulfonate, sodium dodecylbenzenesulfonate, sodium hexanesulfonate, sodium octyl sulfate, sodium pentanesulfonate, and combinations thereof. Some examples of suitable cationic surfactants include polyamine-based surfactants such as those included in the SOLSPERSE® family, Lubrizol Corp., Wickliffe, Ohio.

In an example, the deinking component includes the non-ionic surfactant alone, which is present in the ink dispersion in an amount ranging from about 0.1 wt % to about 30 wt % with respect to the colorant loading. In another example, the non-ionic surfactant is present in the ink dispersion in an amount ranging from about 0.25 wt % to about 2 wt % with respect to the colorant loading.

In instances where the deinking component further includes an anionic surfactant or a cationic surfactant, the loading of the non-ionic surfactant is at least twice the loading of the anionic surfactant or cationic surfactant. In an example, the anionic surfactant and/or the cationic surfactant is present in an amount ranging from about 1 wt % to about 10 wt % with respect to the colorant loading, and the non-ionic surfactant is present in an amount ranging from about 2 wt % to about 20 wt % with respect to the colorant loading.

For the examples of the water-based ink dispersions disclosed herein, in an example, the solvent is chosen from water. In another example, the ink dispersion also includes a co-solvent chosen from 1,2-hexanediol, 2-pyrrolidinone, di-(2-hydroxyethyl)-5,5-dimethylhydantoin (such as DANTOCOL® DHE, commercially available from Lonza Inc., Allendale, N.J.), and combinations thereof. In an example, the total amount of co-solvent ranges from about 0.1 wt % to about 30 wt % of a total weight percent (wt %) of the ink dispersion. In another example, the total amount of co-solvent ranges from about 0.5 wt % to about 10 wt %. In yet another example, the ink dispersion includes from about 2 wt % to about 5 wt % 1,2-hexanediol, and/or from about 4 wt % to about 8 wt % 2-pyrrolidinone, and/or from about 4 wt % to about 8 wt % di-(2-hydroxyethyl)-5,5-dimethylhydantoin.

In some examples, the ink vehicle may include an additive such as, e.g., a biocide, a buffering agent, a chelating agent, and/or the like. In one example, the ink vehicle includes a biocide present in an amount ranging from about 0.01 wt % to about 0.2 wt % of a total weight percent of the ink dispersion.

As previously mentioned, the ink dispersion further includes a colorant. As used herein, the term "colorant" refers to i) one or more pigments, ii) one or more dyes, or iii) combinations of pigment(s) and dye(s). In an example, the colorant may be present in the ink dispersion in an amount ranging from about 3 wt % to about 6 wt %. In two examples, the colorant may be chosen from pigment particles that are self-dispersible in the ink vehicle, or a combination of a dye and a self-dispersing pigment. In two other examples, the colorant may be chosen from pigment particles that are non-self-dispersible in the ink vehicle, or a combination of a dye and a non-self-dispersing pigment. In these latter examples, the printing composition includes, in addition to the ink vehicle and the non-self-dispersible pigment or the ink vehicle and the dye/non-self-dispersible pigment, one or more dispersants (e.g., an anionic or cationic surfactant) to disperse and stabilize the pigment(s).

When utilized, the dispersant is selected so that it is at least partially soluble in the ink vehicle. The dispersant may be chosen from anionic dispersants, cationic dispersants, non-ionic dispersants, polymeric dispersants, oligomeric dispersants, crosslinking dispersants, or combinations thereof. Examples of anionic dispersants include sulfosuccinic acid and derivatives thereof such as, for instance, alkyl sulfosuccinates (e.g., GEROPON® SBFA-30 and GEROPON® SSO-75, both of which are manufactured by Rhodia, Boulogne-Billancourt, France) and docusate sodium. Examples of cationic dispersants include quaternary amine polymers, protonated amine polymers, or polymers containing aluminum (such as those that are available from Lubrizol Corp., Wickliffe, Ohio). Further examples of cationic dispersants include SOLSPERSE® 19000 (Lubrizol Corp.) and other like cationic dispersants. Some examples of non-ionic dispersants include oil-soluble polyesters, polyamines, polyacrylates, polymethacrylates. Some examples of oligomeric dispersants include low average molecular weight (i.e., less than 1000) non-ionic dispersants. Examples of cross-linking dispersants include polymers or oligomers containing two or more carbon double bonds (C=C) and free amine groups such as, e.g., polyamines, crosslinkable polyurethanes, and divinyl benzene.

When a dispersant is used, the dispersant may be included in an amount ranging from about 1 wt % to about 20 wt % of the ink composition.

In the examples where the colorant is or includes a pigment, the pigment may be chosen from organic or inorganic pigment particles, and these particles may have any particle size that allows the composition including the pigment to be printed from the digital printer. In an example, the particle size of the pigments ranges from about 1 nm to about 1 µm. In another example, the particle size of the pigments ranges from about 100 nm to about 500 nm. In still another example, the particle size ranges from about 10 nm to about 100 nm. Organic or inorganic pigment particles may be chosen from black pigment particles, yellow pigment particles, magenta pigment particles, red pigment particles, cyan pigment particles, blue pigment particles, green pigment particles, orange pigment particles, brown pigment particles, white pigment particles, and combinations thereof. In some instances, the organic or inorganic pigment particles may include spot-color or specialty pigment particles. Spot-color pigments are formed from a combination of a predefined ratio of two or more primary color pigment particles. Specialty pigments may, e.g., be metallic, fluorescent and/or opalescent pigments.

An example of a suitable inorganic black pigment includes carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I.

Pigment Yellow 154, C.I. Pigment Yellow 167, C.I. Pigment Yellow 172, C.I. Pigment Yellow 180, and C.I. Pigment Yellow 185.

Some examples of suitable magenta or red organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

In another example, the pigment may be chosen from metallic pigments, where the metallic pigments also have a particle size enabling the composition to be printed from a digital printer. In an example, the particle size of the metallic pigment ranges from about 0.1 µm to about 20 µm. Some suitable metallic pigments include a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include Standard RO100, Standard RO200, and DORADO® gold-bronze pigments (available from Eckart Effect Pigments, Wesel, Germany).

In yet another example, the pigment may be chosen from a pearlescent pigment (also known as an opalescent pigment), where the pearlescent pigments have a particle size that enables the composition to be printed from a digital printer. In an example, the pearlescent particle size ranges from about 0.1 µm to about 20 µm. It is to be understood that suitable pearlescent pigments are those that tend to exhibit various colors depending on the angle of illumination and/or of viewing. Some examples of pearlescent pigments include those of the PRESTIGE® series and of the DORADO PX™ series, both of which are available from Eckart Effect Pigments.

In an example, the pigment may be chosen from polymer-attached pigments or polymer-coated pigments. In this example, the polymer may be chosen in order to modify the surface of the pigment to be hydrophilic (such as the modified pigments of the CAB-O-JET® 400 series, Cabot Corp., Boston, Mass.) or to be hydrophobic (such as the modified pigments of the INDIGO® series, Hewlett-Packard Co., Houston, Tex.). Examples of polymers that may be used to modify the surface(s) of the pigments include copolymers of ethylene and methacrylic acid, polyester, polymethyl methacrylate (PMMA), polystyrene-butadiene, and/or combinations thereof.

In some cases, the pigment may be chosen from surfactant-absorbed pigments, e.g., self-dispersible pigments. Some examples of surfactants that may be incorporated with the pigment for self-dispersion include any of the anionic or cationic surfactants identified above. In some cases, non-ionic surfactants may be used, an example of which includes TRITON-X 100™ (commercially available from Dow Chemical Company, Midland, Mich.).

In yet another example, as mentioned above, the colorant may be chosen from a dye or a combination of dyes alone. In this example, the printing composition includes the carrier and the dye, without pigments and without dispersants. Suitable dyes include water-soluble dyes, pigment-coated dyes, or combinations thereof. Some examples of dyes that may be used as the colorant or one of many colorants include fluorescein, rhodamine, nigrosine, and napthol green. Some examples of water-soluble dyes include DUASYN™ Yellow 3GF-SF, DUASYN™ Red 3B-SF, DUASYNJET™ Cyan FRL-SF, DUASYNJET™ Black NB-SF liq. VP 2495, DUASYN™ Acid Yellow XX-SF, DUASYN™ Brill. Red F3B-SF, DUASYN™ Acid Blue AE-SF 30, and DUASYN™ Black HEF-SF liq. VP 2895, CARTASOL® Yellow 3GF liq., and DUASYN™ Red R-F3B liq, and DRIMARENE® Magenta CR liq. (all of which are manufactured by Clariant, Switzerland). Another example of a water-soluble dye is pigment red.

In an example, the water-based ink dispersion is a water-based cyan ink, a water-based yellow ink, a water-based magenta ink, or a water-based black ink. It is to be understood, however, that the examples disclosed herein may be used to formulate inks having a color other than those identified above.

In another example, the ink dispersion is a water-based ink dispersion having a latex incorporated therein. In this example, the water-based ink dispersion is the same as described above, but the dispersion further includes a latex incorporated therein. The latex may be chosen from latex nanoparticles, some examples of which include acrylonitrile butadiene styrene, acrylic polymers, polyvinyl acetate, polystyrene butadiene, and/or combinations thereof. In an example, the latex-based ink dispersion includes pigment particles present in an amount ranging from about 3 wt % to about 8 wt % of the dispersion, surfactant(s) (including the non-ionic surfactants disclosed herein) present in an amount ranging from about 2 wt % to about 10 wt % of the dispersion, co-solvents present in an amount ranging from about 2 wt % to about 20 wt % of the dispersion, latex nanoparticles present in an amount ranging from about 2 wt % to about 20 wt %, and a balance of water. The water-based latex ink dispersion may also include one or more additives, such as a biocide. In an example, a biocide is present in an amount ranging from about 0.01 wt % to about 2 wt % of the ink dispersion. Some examples of the water-based latex ink include HP 3M Specialty Latex Inks or HP 3M LX 600 Specialty Latex Ink.

It is to be understood that the ink dispersion may be a colorless ink, such as a dispersion that does not include a colorant, e.g., a fixer included in an ink set. In this case, the deinking component(s) may be incorporated into the colorless ink rather than, or in addition to the other inks in the ink set. The deinking component(s) present in the fixer, which is printed under and/or over an image formed from one or more of the other inks in the ink set, interact with the colorant(s) of the other ink(s) to separate the colorant(s) during recycling of the waste paper.

Figure 1:
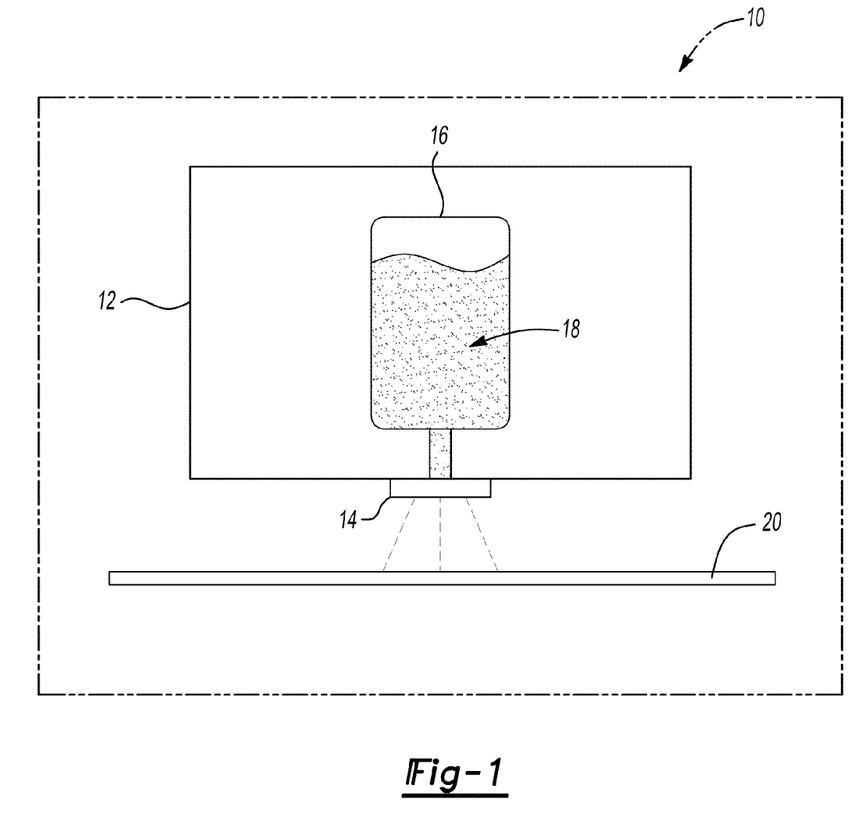
FIG. 1 is a schematic illustration of an example of an ink system that may be used to deposit an example of the ink dispersion disclosed herein onto a substrate to form a printed medium.

Also disclosed herein is an ink system including a printing system configured to deposit the ink dispersion on a medium. An example of a printing system 10 is semi-schematically depicted in FIG. 1. The system 10 includes an inkjet printing system or device 12 (such as, e.g., a continuous device, a drop-on-demand device, a thermal inkjet (TIJ) device, or a piezoelectric inkjet device) having at least one inkjet fluid ejector 14. It is to be understood that, although a single ejector 14 is shown in FIG. 1, there may be a plurality of ejectors 14. The fluid ejector 14 is fluidically coupled to an ink chamber 16 that contains an example of the ink dispersion (identified by reference numeral 18). The fluid ejector 14 is configured to eject the ink dispersion 18 onto a medium 20, where the ink dispersion 18 is retrieved from the ink chamber 16 during printing.

In an example of the printing device 12 including additional fluid ejectors (not shown in FIG. 1), each additional fluid ejector is respectively fluidically coupled to at least one other ink chamber (also not shown in FIG. 1). For example, the inkjet printing system 10 may include an ink set having two or more inks, each of which is stored in a respective ink chamber. The ink chambers may be in fluid communication with a single fluid ejector, or may be in fluid communication with their own respective fluid ejectors.

In an example, during inkjet printing, a portion of the ink may be retrieved from the ink chamber 16, and then deposited onto the medium 20 via the fluid ejector 14 to form a printed medium. The medium 20 may take the form of a media sheet or of a continuous web suitable for printing via the printing system depicted, e.g., in FIG. 1. The medium 20 may be a base paper manufactured from cellulose fibers. In an example, the base paper may be produced from chemical pulp, mechanical pulp, thermal mechanical pulp, and/or combinations thereof. In some cases, the base paper may also include additives such as internal sizing agents and fillers. The internal agents may be added to the pulp before the pulp is converted into a paper web or medium. The fillers may be any type of filler used in paper such as, e.g., calcium carbonate, talc, clay, kaolin, titanium dioxide, and combinations thereof. The base paper may also be uncoated raw paper, or a pre-coated paper. In an example, the paper has a basis weight ranging from about 100 g/m$^2$ to about 250 g/m$^2$.

Fibers of the medium 20 upon which the ink was deposited to form the printed medium may be recycled using a conventional paper recycling process. For example, the printed medium may be placed inside a recycling mill, and then the colorant of the ink deposited on the printed medium may be detached from the fibers of the medium 20 to form a deinked pulp. The detaching of the colorant from the medium 20 may be referred to herein as a deinking process, and an example of the deinking process is diagrammatically shown in FIG. 2. This deinking process includes introducing the printed medium into a pulper of the recycling mill, and then chopping the printed medium up into smaller pieces. In some cases, water and possibly certain pH adjusting chemicals, bleaching chemicals, or the like may be added inside the pulper while the medium is chopped, thereby converting the printed medium into a slurry of pulp and ink (as shown at reference numeral 200 in FIG. 2).

Figure 2:
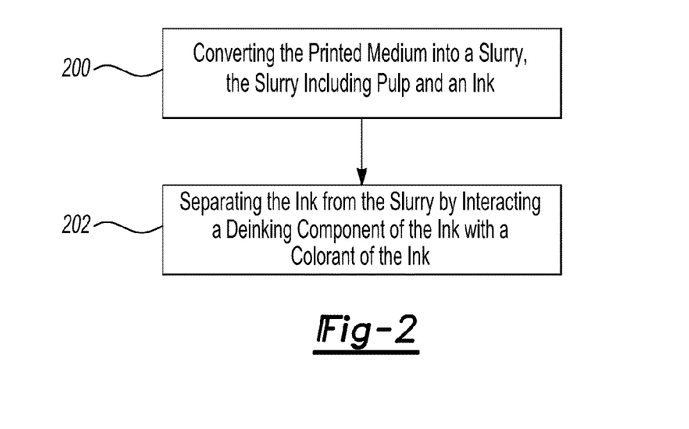
FIG. 2 is a flow diagram depicting an example of a method of deinking a printed medium.

Upon making the slurry, examples of the method of the present disclosure include separating the ink from the slurry by interacting the deinking component of the ink with the colorant of the ink (as shown at reference numeral 202), which causes the colorant to separate from the fiber and/or causes the colorant particles to aggregate into large groups.

In some instances, the pulp slurry is screened to remove any materials that may be denser than the pulp, such as contaminants or other foreign matter. In an example, coarse and fine screening may be accomplished, for example, by passing the slurry over or through a screen with varying slot opening sizes to separate such materials from the slurry, and these materials may be caught using another mesh screen.

The ink is removed from the slurry by introducing the slurry into a froth flotation cell, and then introducing a collector (e.g., a frother) into the slurry. In an example, air is also blown into the slurry. Since the frother has an affinity to the now-detached colorant particles, the colorant particles attach to the frother. The air bubbles lift the colorant particles to the surface of the flotation cell as a thick froth, which may be removed from the cell.

To further illustrate the present disclosure, examples are given herein. It is to be understood that these examples are provided for illustrative purposes and are not to be construed as limiting the scope of the disclosed example(s).

EXAMPLES

Example 1

Figure 3:
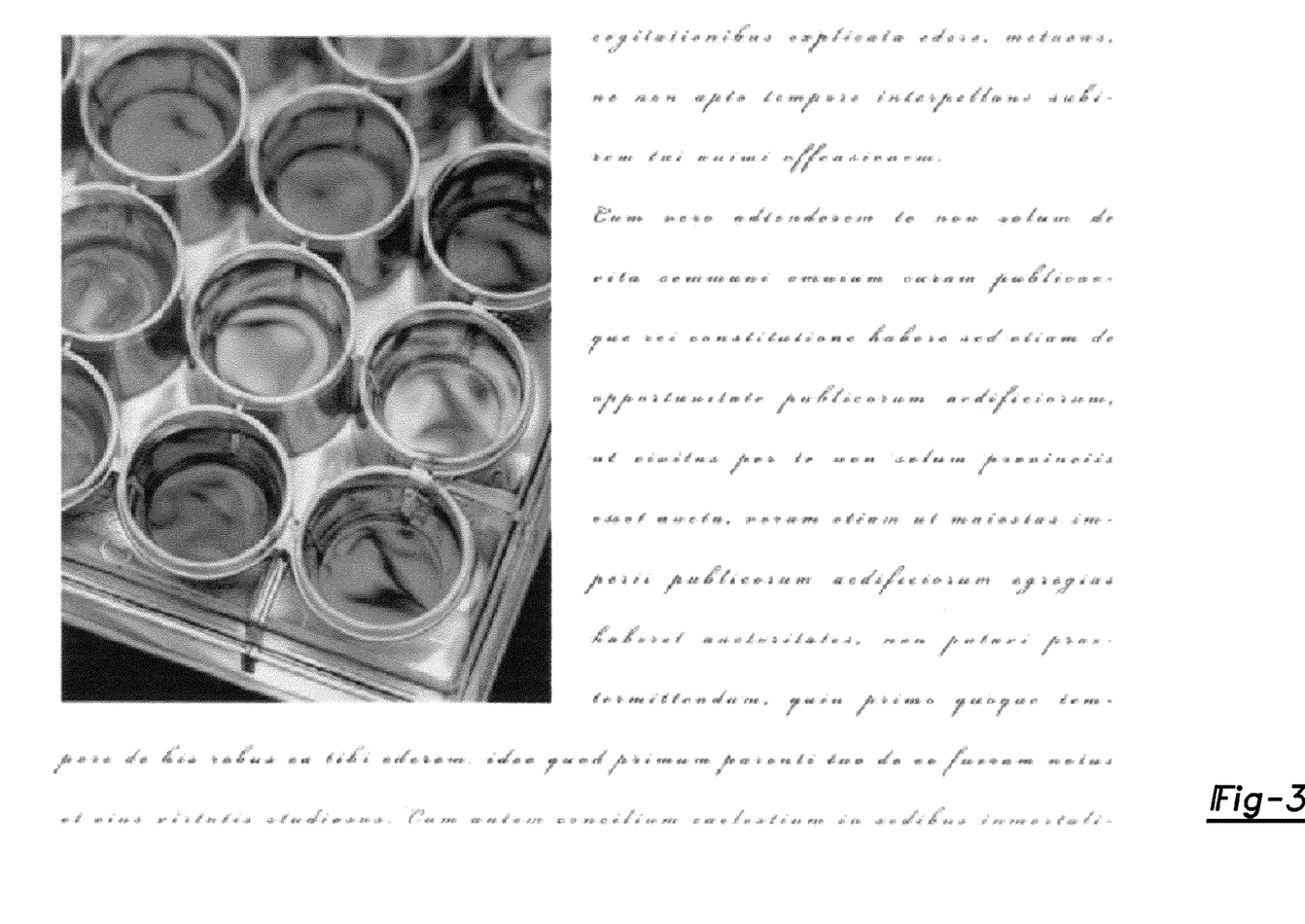
FIG. 3 is a photograph of a deinking test plot printed using an example of the ink dispersion that includes MYRJ® 45 as a deinking component.

A series of deinking experiments were performed on several ink dispersions, where each dispersion had a different non-ionic surfactant incorporated therein. The ink dispersions were prepared by mixing about 3 wt % to about 4 wt % of a self-dispersible pigment with about 5 wt % of the non-ionic surfactant indicated in Table 1 below. The self-dispersible pigment for all of the inks set forth in Table 1 (i.e., inks 1 through 7) was selected from a self-dispersible cyan pigment. These ink dispersions are listed in Table 1 hereinbelow, and were formulated as follows. The non-ionic surfactant was introduced separately into each of the ink dispersions, and each dispersion was jetted from a thermal printhead to create a test pattern on regular paper (as shown in FIG. 3). The deinkability of the pigments from the paper was evaluated by pulping the paper sample in a pulper in the presence or absence of a regular deinking chemical set consisting of NaOH, sodium silicate, hydrogen peroxide, and oleic acid. The pulping was accomplished for about 10 minutes to about 20 minutes, followed by froth flotation for about 10 minutes to about 20 minutes in the presence of a frother. Handsheets and filter pads were made from the deinked and undeinked pulps to test for the various optical properties.

TABLE 1

Ink dispersions 1 through 7, each including a non-ionic surfactant deinking component

| Ink | Non-ionic surfactant | Formula | HLB | Avg. specific diameter ($\mu$m) | Ink speck Contamination ($A_{50}/A_{250}$) (mm$^2$/m$^2$) | Ink Elimination (%) | Optical Brightness (Y) | Filtrate darkening $\Delta$Y | a* (Color Shade) | Score (%) |
|---|---|---|---|---|---|---|---|---|---|---|
| 1 | BRIJ ® 52 | $C_{16}H_{33}$—$(OCH_2CH_2)_2OH$ | 5 | 133.9 | 700/180 | 76 | 86 | 1 | −.39 | 95 |
| 2 | BRIJ ® 30 P4391 | $C_{12}H_{25}$—$(OCH_2CH_2)_4OH$ | 9 | 134.9 | 610/170 | 80 | 88 | 0.5 | 0.25 | 99 |
| 3 | MYRJ ® 45 | $H(OCH_2CH_2)_8$—$OCH_2(CH_2)_{16}CH_3$ | 11.1 | 104.6 | 59.2/0 | 85 | 86 | 0.5 | 0.58 | 100 |
| 4 | BRIJ ® 97 | $C_{18}H_{35}$—$(OCH_2CH_2)_{10}OH$ | 12 | 118.7 | 84/0 | 75 | 89 | 0 | −.9 | 100 |
| 5 | BRIJ ® 98 | $C_{18}H_{35}$—$(OCH_2CH_2)_{20}OH$ | 15.3 | 170.5 | 566/160 | 81 | 86 | 0.1 | −.65 | 100 |
| 6 | BRIJ ® 700 | $C_{18}H_{35}$—$(OCH_2CH_2)_{100}OH$ | 18 | 197.4 | 3352/2275 | 75 | 88 | 0.2 | −.32 | Non-deinkable |
| 7 | Methoxy PEG 350 | $CH_3$—$(OCH_2CH_2)_{12}OH$ | 19.3 | 225 | 10545/9538 | 75 | 81 | 1 | −.39 | Non-deinkable |

It was found that the non-ionic surfactants listed above that have an HLB value falling within the range of 5 to 16 (i.e., those that were incorporated into Inks 1 through 5) were effective as a displector in the presence of a frother such as sodium dodecyl sulfate. It was also found that a non-ionic surfactant having an ink speck contamination of less than 2000 ($A_{20}/A_{250}$)(mm$^2$/m$^2$) (where $A_{20}$ refers to ink specks with a diameter of less than about 20 microns, while $A_{250}$ refers to ink specks with a diameter of less than about 250 microns) when used in an ink dispersion renders the ink suitably deinkable according to examples herein. Further, Inks 1 through 5 all exhibited a total score (which was deduced by using the European Recycling Paper Council's deinking scorecard, where an ink having a score of 70% and above is considered to have good deinkability) that was at least 95% (e.g., Ink 1). This score is significantly higher than the minimum threshold score of 70% according to the European Recycling Paper Council's deinking score card, as mentioned above. It was therefore determined that the non-ionic surfactant incorporated into Inks 1 through 5 delivered good deinkability for their respective digital inks. This is in contrast to Inks 6 and 7, each of which included a non-ionic surfactant that produced a total score of less than 70%, which rendered the inks as non-deinkable, at least in part because the inks failed in at least one category.

Example 2

Ink 3 shown in Table 1 above was jetted from a thermal inkjet printer at an ink drop jetting frequency ranging from about 1 kHz to about 24 kHz. The printing was accomplished without any significant issues pertaining to the nozzles of the printhead (such as, e.g., nozzle clogging or the like).

Test plots were printed on white paper, and the plots were subjected to a deinking evaluation in the laboratory. One of these test plots is shown in FIG. 3 (printed with an example of the ink dispersion that includes MYRJ® 45 as a deinking component). The test pattern shown in FIG. 3 was prepared by creating separate ink dispersions of similar compositions with respective colored pigments. The test pattern has an ink coverage of about 30% for each plot. In this example, about 200 g of the printed papers were pulped in the absence of deinking chemicals, which would have normally been added during a typical paper recycling process. The pulp was then added to a flotation cell (still in absence of deinking chemicals), and then a frother. It was found that the pigments of the inked portion of the printed papers were effectively removed during the flotation, and that the type of pigment did not significantly affect the outcome of the deinking. It was also found that ink particles and filler materials of the paper were the main components found in the reject reservoir of the flotation cell.

Figure 4A:
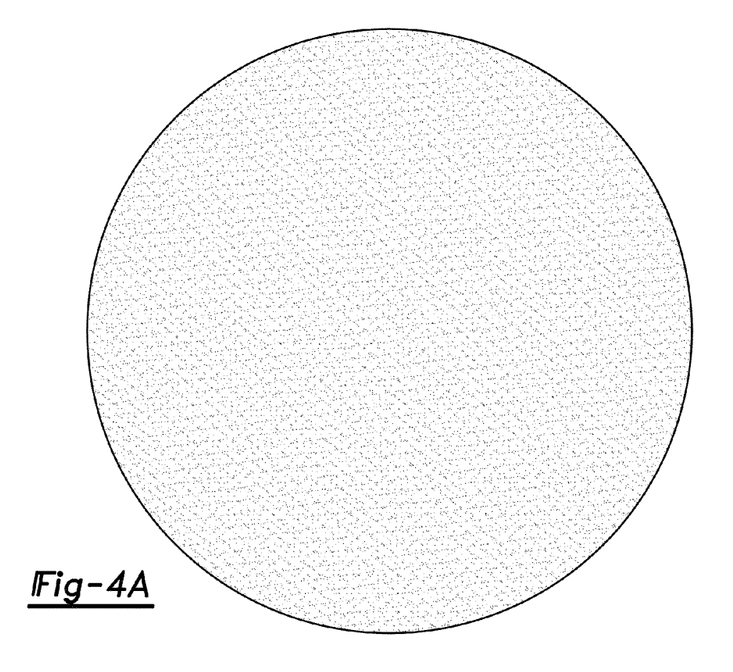
FIGS. 4A and 4B are schematic representations of optical images of a handsheet made from non-deinked pulps (FIG. 4A) and deinked pulps (FIG. 4B).
Figure 4B:
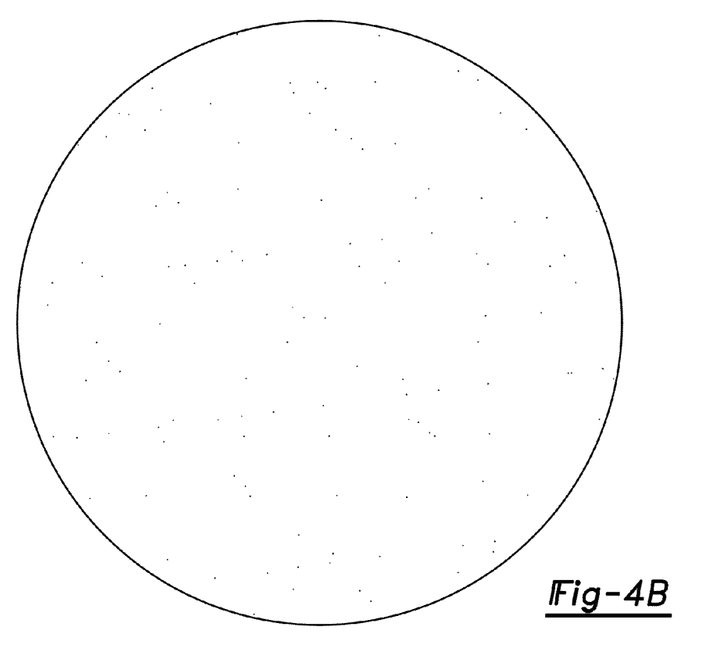

Handsheets (made from both non-deinked pulps and deinked pulps) and filter pads were then made to evaluate the efficiency of the non-ionic surfactants incorporated into the ink dispersion. A schematic representation of the handsheet made from non-deinked pulps is shown in FIG. 4A, and a schematic representation of the handsheet made from deinked pulps according to the method described above is shown in FIG. 4B. It was found that the ink speck counts on the handsheet shown in FIG. 4B (which was subjected to pulping and flotation) were less than about 100, which was significantly less than the targeted level of 600 set by the European Recycling Paper Council's deinking score card. It was also found that the optical brightness of the handsheet shown in FIG. 4B was close to about 100, which was better than the target level of 90. Further, the ink elimination was greater than 95%, which was better than the target level of 80%. Further, the filtrate darkening (which indicated discoloration of the deinking process water) was 1, which is better than the target level of 5. The color shade was also within the target range of −2 to 1. Further, the fiber yield was greater than about 80%, which is comparable to or better than that of existing deinking chemistries.

It is to be understood that the ranges provided herein include the stated range and any value or sub-range within the stated range. For example, a range from about 0.1 wt % to about 30 wt % should be interpreted to include not only the explicitly recited limits of about 0.1 wt % to about 30 wt %, but also to include individual values, such as 0.2 wt %, 5 wt %, 12 wt %, etc., and sub-ranges, such as from about 0.5 wt % to about 10 wt %, from about 3 wt % to about 20 wt %, etc. Furthermore, when "about" is utilized to describe a value, this is meant to encompass minor variations (up to +/−10%) from the stated value.

While several examples have been described in detail, it will be apparent to those skilled in the art that the disclosed examples may be modified. Therefore, the foregoing description is to be considered non-limiting.

What is claimed is:

1. An ink dispersion, consisting of:
   an ink vehicle, consisting of:
   a non-ionic surfactant having an HLB value ranging from about 5 to about 16, the non-ionic surfactant being selected from the group consisting of polyethylene glycol hexadecyl ether ($C_{16}H_{33}$—$(OCH_2CH_2)_2OH$), polyethylene glycol stearate $CH_3(CH_2)_{16}COO(CH_2CH_2O)_8H$, and combinations thereof;
   water as a solvent; and
   optionally an additive selected from the group consisting of a biocide, a buffering agent, a chelating agent, and combinations thereof; and
   a colorant dispersed in the ink vehicle;
   wherein the non-ionic surfactant is a displector, and wherein the displector, when combined with a frother from a waste paper recycling system, enables deinking of the colorant from a medium on which the colorant is established.

2. The ink dispersion as defined in claim 1 wherein the biocide is present in an amount ranging from about 0.01 wt % to about 0.2 wt % of a total weight percent of the ink dispersion.

3. The ink dispersion as defined in claim 1 wherein the colorant is chosen from at least one of a pigment or a dye, and wherein the colorant is present in an amount ranging from about 3 wt % to about 6 wt % of a total weight percent of the ink dispersion.

4. The ink dispersion as defined in claim 3 wherein the pigment is chosen from a self-dispersed pigment, a polymer-attached pigment, a surfactant-absorbed pigment, a polymer-coated pigment, or combinations thereof.

5. The ink dispersion as defined in claim 3 wherein the dye is chosen from a water-soluble dye, a pigment-coated dye, or combinations thereof.

6. An ink system, comprising:
   a printing system, including:
   at least one ink chamber for storing an ink dispersion, the ink dispersion consisting of:
   an ink vehicle, consisting of:
   a non-ionic surfactant having an HLB value ranging from about 5 to about 16, the non-ionic surfactant being selected from the group consisting of polyethylene glycol hexadecyl ether ($C_{16}H_{33}$—$(OCH_2CH_2)_2OH$), polyethylene glycol stearate $CH_3(CH_2)_{16}COO(CH_2CH_2O)_8H$, and combinations thereof;
   water as a solvent; and
   optionally an additive selected from the group consisting of a biocide, a buffering agent, a chelating agent, and combinations thereof; and
   a colorant dispersed in the ink vehicle;
   at least one fluid ejector for depositing, onto a medium, a portion of the ink dispersion retrieved from the at least one ink chamber; and
   the medium upon which the portion of the ink dispersion is to be deposited;
   wherein the non-ionic surfactant is a displector, and wherein the displector, when combined with a frother from a waste paper recycling system, enables deinking of the colorant from the medium.

7. The ink system as defined in claim 6 wherein the printing system is a digital printing system that uses thermal inkjet printing or piezoelectric inkjet printing.

8. The ink system as defined in claim 6 wherein the HLB value of the non-ionic surfactant ranges from about 8 to about 13.

9. A method of deinking a printed medium, comprising:
   converting the printed medium into a slurry, the slurry including pulp and an ink that was printed on the medium, wherein the ink consists of:
   an ink vehicle, consisting of:
   a non-ionic surfactant being a deinking component and having an HLB value ranging from about 5 to about 16, the non-ionic surfactant being selected from the group consisting of polyethylene glycol hexadecyl ether ($C_{16}H_{33}$—$(OCH_2CH_2)_2OH$), polyethylene glycol stearate $CH_3(CH_2)_{16}COO(CH_2CH_2O)_8H$, and combinations thereof;
   water as a solvent; and
   optionally an additive selected from the group consisting of a biocide, a buffering agent, a chelating agent, and combinations thereof; and
   a colorant dispersed in the ink vehicle;
   wherein the non-ionic surfactant is a displector, and wherein the displector, when combined with a frother from a waste paper recycling system, enables deinking of the colorant from a medium on which the colorant is established; and
   separating the ink from the slurry by interacting the deinking component of the ink with the colorant that is present in the ink.

10. The method as defined in claim 9 wherein the printed medium includes digital printed papers.

11. The method as defined in claim 9, further comprising removing the separated ink from the slurry by incorporating a frother into the slurry.

12. An ink dispersion, consisting of:
   an ink vehicle, consisting of:
   polyethylene glycol hexadecyl ether ($C_{16}H_{33}$—$(OCH_2CH_2)_2OH$) as a non-ionic surfactant having an HLB value of 5;
   a solvent; and
   optionally an additive selected from the group consisting of a biocide, a buffering agent, a chelating agent, a latex, a co-solvent, and combinations thereof; and
   a colorant dispersed in the ink vehicle;
   wherein the non-ionic surfactant is a displector, and wherein the displector, when combined with a frother from a waste paper recycling system, enables deinking of the colorant from a medium on which the colorant is established;
   and wherein the ink dispersion is a water-based dispersion.

* * * * *

UNITED STATES PATENT AND TRADEMARK OFFICE
CERTIFICATE OF CORRECTION

PATENT NO.        : 8,764,894 B2                                       Page 1 of 1
APPLICATION NO.   : 12/916141
DATED             : July 1, 2014
INVENTOR(S)       : Hou T. Ng et al.

It is certified that error appears in the above-identified patent and that said Letters Patent is hereby corrected as shown below:

In the Specification

Columns 11-12, line 11, Table 1, delete "$H(OCH_2CH_2)_8\text{--}OCH_2(CH_2)_{16}CH_3$" and insert -- $CH_3(CH_2)_{16}COO(CH_2CH_2O)_8H$ --, therefor.

Signed and Sealed this
Seventh Day of October, 2014

Michelle K. Lee
*Deputy Director of the United States Patent and Trademark Office*